Patented Sept. 26, 1939

2,173,977

UNITED STATES PATENT OFFICE 2,173,977

PURIFICATION OF TANNIN EXTRACT

Charles R. Oberfell, Lynchburg, Va., assignor to The Mead Corporation, Chillicothe, Ohio, a corporation of Ohio No Drawing. Application September 12, 1935, Serial No. 40,279

6 Claims. (Cl. 87—28)

This invention relates to tannin extract, and more particularly to the purification of tannin extract and the clarifying and decolorizing of the same.

The principal object of this invention is to provide a highly satisfactory, simple, and inexpensive purification process for the clarifying and decolorizing of tannin extract.

Another object is to provide for the utilization in such a purification process of a blood albumen solution so as to produce efficient clarification and decolorization with low tannin loss.

Another object is to provide for the controlled addition of blood albumen to hot extracted tannin liquor, thus simplifying the process and avoiding costly cooling and reheating.

A further object is to provide as a highly effective and inexpensive product a tannin extract material produced in accordance with the above method and of a high degree of purity and capable of producing a very light color on leather.

Other objects and advantages of this invention will be apparent from the following description and the appended claims.

Tannin extract from the leaching of wood chips, or by other methods, is ordinarily obtained in a state which is not sufficiently pure for many purposes. Among the impurities usually present are finely divided insoluble materials which make thorough and rapid filtration impossible. Also present are soluble impurities, including some coloring matters, which are not removed by simple filtration. Because of these characteristics of the tannin extract, purification thereof has heretofore been slow and difficult.

This invention provides a simple and economical process of decolorizing the tannin extract by effecting the removal or elimination of such soluble or other materials as impart objectionable color thereto and also of clarifying the extract by removal therefrom of objectionable insoluble material in suspension. In accordance with this invention a tannin extract is obtained as a light colored product, substantially free of any dull appearance, and also substantially free of reaction products of the impurities. This invention is economical in practice, facilitates separation of impurities, avoids unnecessary heating or cooling of the tannin extract, requires only a small amount of albumen, and provides a very desirable refined tannin extract as above mentioned, with a low tannin loss.

In the practicing of this invention, the extract is submitted to the action of a solution of albumen as a purifying medium. Blood albumen has been found to be particularly satisfactory for this purpose when used under conditions properly controlled. For illustration purposes, this invention will be described as practiced with blood albumen.

The tannin liquor is extracted from the raw material, such as wood chips or the like in any desired manner. For example, a series of leaching tubs may be used, or if preferred an autoclave extraction battery may be used. The tannin liquor so obtained is usually at a relatively high temperature, above the normal coagulating temperature of a blood albumen solution. In accordance with this invention the tannin extract is preferably treated in such heated condition with a purifying material, such as the blood albumen solution, without the necessity of cooling the extract before the addition of the purifying material. Blood albumen solution has a usual minimum coagulating temperature of about 150° F., and the extract should preferably have a temperature sufficiently high such that coagulation of the albumen material will take place immediately upon admixture; for commercial operations this temperature should be somewhat above the minimum coagulation temperature, for example of the order of 165° F. or above, in the use of blood albumen solution.

It is important that the blood albumen solution be added to the heated tannin extract under such controlled conditions that an instantaneous and intimate intermixture of the two materials is effected. The conditions should be controlled so that the entire quantity of tannin extract is subjected to the action of the purifying material and the desired intimacy and completeness of contact thereby obtained. It is found that when the blood albumen solution is added under such controlled conditions, an immediate reaction takes place, the blood albumen becoming coagulated and, by reason of its thorough and homogeneous intermixture with the tannin extract, becomes effective to thoroughly purify and remove objectionable coloring matter and impurities from the tannin extract.

This desired intimacy of intermixture may be obtained in several different ways. In order to assist in obtaining the desired intermixture, the blood albumen solution may be made quite dilute, and may be then added to the tannin extract relatively slowly while the extract is stirred or agitated to bring the entire body of the extract into contact with the blood albumen solution. Alternatively a device such as a high speed centrifugal pump may be provided into which both the tannin extract and the blood albumen solution are supplied and in which a thorough and effective intermixture of the two substances would be effected. When the albumen solution, preferably of controlled dilution is thus uniformly intermixed with the tannin extract in heated condition, a coagulation of the albumen results immediately and the impurities are caused to precipitate and become suspended in the liquid in a readily removable form.

The quantity of albumen required for a given quantity of tannin extract is not particularly critical, but in plant scale operation such amount is used as will insure satisfactory purification thereof. Where chestnut chips are used as the raw material, satisfactory results have been obtained by using .1% air dry albumen on the basis of the total weight of the leach liquor, although lesser amounts have been successfully used with some decrease of effectiveness, and of course the quantity may be increased if desired.

The desired quantity of blood albumen may be made up into an aqueous solution of a predetermined or desired degree of dilution. The degree of dilution may vary over wide limits, depending upon the way in which the two materials are intermixed, the character of the purifying medium, and the provisions for obtaining the desired instantaneous and intimate mixture thereof. As illustrative however of a range of dilutions which is found to produce entirely satisfactory results in plant scale operation, the blood albumen solution may be made up into dilution ranging from approximately .5% to 10% or above.

The most satisfactory dilution of a blood albumen solution, for use with chestnut extract was found to be approximately a 5% solution.

When such solution of controlled dilution is added slowly to the heated tannin liquor, the tannin liquor being simultaneously stirred or agitated as by means of air blasts in the bottom of the container, the desired homogeneous and complete intermixture is obtained, with the entire body of tannin liquor being brought into reactive contact with the blood albumen material, under such conditions that effective purification results. When the invention is practiced in this manner it is found that a very satisfactory and economical operation is obtained, the tannin loss in particular remaining quite small such that it can be disregarded commercially. In a number of plant runs a maximum tannin loss of approximately 2 to 2½% was observed.

Following the addition of the blood albumen solution to the tannin liquor and the resultant coagulation of the albumen material, the soluble impurities are rendered insoluble and removed from solution and those impurities in suspension are caused to adhere to the particles of albumen, in the form of a readily separable suspension. This suspended matter comprising the impurities and the like may be then removed from suspension in any desired manner. Thus the larger part, from approximately 75% to 80% of the suspension may be removed satisfactorily by continuous flow sedimentation, the liquor with the remaining suspended material then being concentrated in vacuo and the impurities being removed by gravity settling. In place of continuous flow sedimentation a clarifier such for example as of the Dorr type may be used. Or furthermore a filter press may be used. Or if desired the impurities may be removed by a continuous flow type of centrifuge, centrifuging usually serving to effectively remove the entire quantity of suspended material.

As a specific example showing the carrying out of this process, chestnut chips are leached in an autoclave extraction battery having a capacity of 2,000 gallons, and the tannin extracted. The resultant tannin liquor leaves the battery at a temperature of the order of 165° F. Using .1% albumen on the weight of the liquor requires approximately 16.85 pounds of air dry albumen which may be made into a 5% solution, the albumen being dissolved in 40 gallons of water at room temperature. The albumen solution is added slowly and continuously over a period of 5 to 10 minutes to the heated tannin liquor, agitation being maintained by an air flow in the mixing vessel during the mixing of the two liquids. Following the mixture, the liquid may be allowed to cool to room temperature and the suspended particles are then separated out by any of the means outlined above. At the conclusion of the separation step, the resulting pure liquor is concentrated to the degree required for the particular use to which it is to be put.

It is now apparent that this invention results in a simple, effective and economical process for the purification of tannin extract, and results in providing a purified tannin extract capable of producing a very light and highly desirable color on leather. Furthermore the process is particularly economical, and involves a small loss of tannin material.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The process of purifying a tannin extract through the use of albumen which comprises adding to the tannin extract while in a heated condition above the normal coagulating temperature of the albumen a solution containing of the order of .5% to 10% of blood albumen under conditions favoring a homogeneous and intimate intermixture thereof with resulting purification and suspension of impurities, and thereafter removing suspended impurities to provide a purified tannin extract.

2. The process of purifying a heated tannin extract through the addition of albumen thereto while avoiding the formation of lumps of albumen which includes adding the albumen in dilute solution of low concentration of albumen to the tannin extract heated to a temperature above the normal coagulating temperature of the albumen, and controlling the addition of the albumen solution to secure an intimate and thorough intermixture thereof with the heated extract, with resultant coagulation of the albumen and precipitation of the impurities from the extract.

3. The process of purifying a heated tannin extract through the addition of albumen thereto while avoiding the formation of lumps of albumen which includes adding the albumen in a solution of predetermined dilution of the order of .5% to 10% to the tannin extract heated to a temperature above the normal coagulating temperature of the albumen, and controlling the addition of the albumen solution to secure an intimate and thorough intermixture thereof with the heated extract, with resultant coagulation of the albumen and precipitation of the impurities from the extract.

4. The process of purifying a tannin extract through the use of albumen which comprises adding slowly to the heated tannin liquor while at a temperature above the normal coagulating temperature of the albumen a dilute solution of low concentration of albumen with resultant coagulation thereof and simultaneously agitating the mixture to produce instantaneous and intimate intermixture thereof.

5. The process of purifying a tannin extract which comprises bringing a dilute solution of low concentration of blood albumen into intimate admixture with the tannin liquor while such liquor is at a temperature above the normal coagulating temperature of the blood albumen to effect precipitation of impurities therefrom, and thereafter removing said impurities from the liquid.

6. The process of producing a purified tannin extract through the use of albumen which comprises leaching wood chips by a hot leaching process, withdrawing the heated leach liquor, adding thereto while at a temperature above the normal coagulating temperature of the albumen a dilute solution of low concentration of blood albumen with resultant coagulation thereof and simultaneously effecting intimate intermixture of said leach liquor with said blood albumen.

CHARLES R. OBERFELL.